E. F. HUDSON.
POULTRY DUSTER.
APPLICATION FILED JULY 24, 1915.
1,167,561.
Patented Jan. 11, 1916.
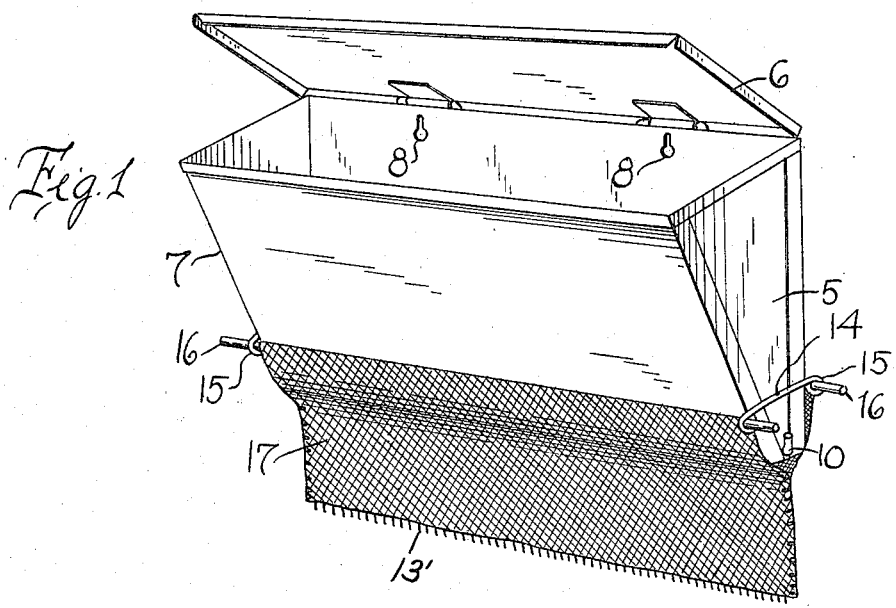
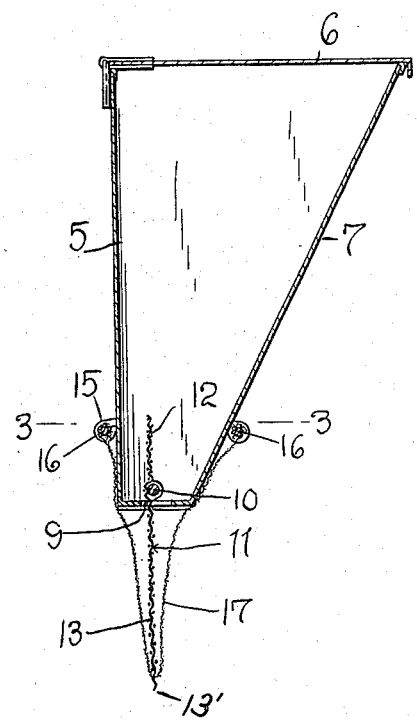
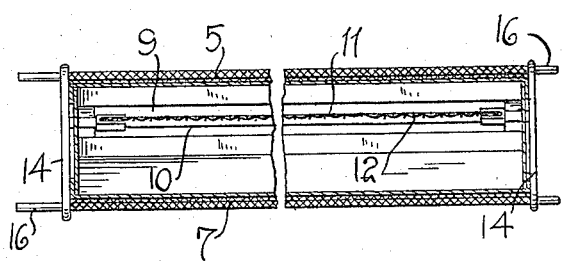
Inventor
E. F. HUDSON
By Watson E. Coleman
Attorney

UNITED STATES PATENT OFFICE.

EDWARD F. HUDSON, OF WILKES-BARRE, PENNSYLVANIA.

POULTRY-DUSTER.

1,167,561.  Specification of Letters Patent.  Patented Jan. 11, 1916.

Application filed July 24, 1915.  Serial No. 41,704.

*To all whom it may concern:*

Be it known that I, EDWARD F. HUDSON, a citizen of the United States, residing at Wilkes-Barre, in the county of Luzerne and State of Pennsylvania, have invented certain new and useful Improvements in Poultry-Dusters, of which the following is a specification, reference being had to the accompanying drawings.

This invention relates to an improved poultry duster and has for its primary object to provide a very simple and effective device which is primarily operated by the fowl to apply a germicide powder to the body of the fowl.

It is another and more particular object of the invention to provide a device for the above purpose, including a hopper provided with an outlet at its lower end, an agitator movably mounted in the outlet and extending interiorly and exteriorly of the hopper, and means secured to the exterior of the hopper and to the agitator whereby the powder is sifted upon the body of the fowl when the agitator is moved.

The invention has for a further general object to provide a device of the above character which is exceedingly simple in its construction, highly reliable and effective in practical use and which may be manufactured at relatively small cost.

With the above and other objects in view, my invention consists in the novel features of construction, combination and arrangement of parts to be hereinafter more fully described, claimed and illustrated in the accompanying drawing, in which, Figure 1 is a perspective view of my improved poultry duster; Fig. 2 is a vertical transverse section of the same; and Fig. 3 is a section taken on the line 3—3 of Fig. 2.

Referring in detail to the drawing, 5 designates a hopper of suitable form and capacity, which is provided with a hinged lid or cover 6. The hopper body is preferably formed with a straight vertical rear wall and a tapering or inclined front wall 7. In the rear body wall of the hopper, adjacent the upper edge thereof, openings 8 are provided to receive spaced hooks, nails or other supporting elements. The lower or bottom end of the hopper body is provided with a longitudinally extending slot 9 and a longitudinally disposed shaft 10 extends through the hopper immediately above said slot, the ends of said rod or shaft being mounted in the end walls of the hopper and extending exteriorly thereof. Upon the shaft 10, a sheet of wire mesh or other reticulated material, indicated at 11, is suitably secured, and has a narrow portion 12 projecting upwardly above the shaft into the hopper and a relatively wide portion 13 extending downwardly through the slot 9 and below the hopper 5.

To the end walls of the hopper 5, exteriorly thereof, the short, transversely disposed, curved wire rods 14 are soldered or otherwise permanently secured. The extremities of these rods project beyond the opposite side walls of the hopper body 5 and are formed with the eyes 15 therein. In the corresponding eyes on the ends of the rods 14, longitudinally extending rods 16 are mounted. To each of these rods, the ends of a length of fabric netting 17 are suitably secured. This netting provides a sheath or cover for the depending portion 13 of the wire mesh plate 11. The ends of the netting 17 are drawn together around the ends of the wire sheet 11 and stitched or otherwise suitably secured together. It will be seen that this fabric netting provides what is in effect, a sifting funnel to receive the germicide powder falling downwardly through the slot in the bottom of the hopper upon opposite sides of the screen plate 11. The vertical wires of the screen plate 11 project downwardly through the netting 17 to form a comb 13'.

In the practical operation of the device, the hopper is suitably mounted above the entrance to the hen house or coop and, as the fowls enter the same, they will strike the lower longitudinal edge of the swinging wire screen plate 11 and thus move the same so that the upper edge portion 11 thereof will agitate the powder within the hopper and the same will fall downwardly through the slot 9. This powder sifts through the fabric netting upon the body of the fowl, the feathers having been opened or spread apart by the comb 13'. In this manner, it will be seen that the powder is positively applied to the fowl's body by means which is actuated by the fowl. By the provision of the fabric net 17, the powder is held upon opposite sides of the wire screen plate when the latter is stationary and undue waste of the same is obviated, the powder sifting through the meshes of the fabric only when the swinging plate is moved or agitated.

From the foregoing description, taken in connection with the accompanying drawing, it will be seen that I have produced a very simple and highly effective device for the above purpose and one which may be cheaply manufactured. The hopper can, of course, be made of any desired length and of any capacity, or a single hopper may be provided with a plurality of the swinging agitating screen plates.

While I have shown and described what I believe to be the preferred embodiment of the device, it is to be understood that the same is susceptible of considerable modification therein and I, therefore, reserve the privilege of resorting to all such legitimate changes as may be fairly embodied within the spirit and scope of the invention as claimed.

Having thus fully described my invention, what I desire to claim and secure by Letters Patent is:—

1. A poultry duster comprising a hopper having a longitudinal slot in its bottom, an agitating member mounted for swinging movement upon the hopper and extending above and below said slot, and means secured to the exterior of the hopper and connected to said agitating member to receive powder falling through said slot and sift the same upon the body of the fowl.

2. A poultry duster comprising a hopper having an opening in its bottom, an agitating member mounted for swinging movement upon the bottom of the hopper and extending interiorly and exteriorly thereof, and an open mesh sheath for the exteriorly disposed portion of the agitating member to receive the powder from the hopper and sift the same upon the body of the fowl.

3. A poultry duster comprising a hopper having an opening in its bottom, an agitating member mounted for swinging movement in the bottom of the hopper and extending interiorly and exteriorly thereof, and an open mesh fabric sheath extending around the exteriorly disposed portion of the agitating member and held at its longitudinal edges upon the walls of the hopper, said sheath receiving the powder from the hopper when the agitator is moved and sifting the same upon the body of the fowl.

4. A poultry duster comprising a hopper having a longitudinal slot in its bottom, a longitudinally disposed rod rotatably mounted in the end walls of the hopper and extending above said slot, a reticulated agitating member fixed upon said rod and extending above and below the same interiorly and exteriorly of the hopper, longitudinal rods mounted upon the side walls of the hopper exteriorly thereof, and an open mesh fabric sheet secured at its edges upon said rods and extending around the exteriorly disposed portion of the agitating member, the opposite sides of the fabric being secured together at their ends, said fabric constituting a sheath to receive the powder falling through said slot when the agitator is moved and sifting the same upon the body of the fowl.

5. A poultry duster comprising a hopper, a receiving member having reticulated walls through which the powder received from the member is adapted to sift, and an oscillatable comb mounted upon the hopper adapted to spread or separate the feathers of the fowl.

6. A poultry duster comprising a hopper, an oscillatable agitating member mounted in the bottom of the hopper and extending downwardly through the base wall thereof, and a sheath inclosing the downwardly projecting portion of said member having reticulated walls through which the powder from the hopper is adapted to sift, the lower edge of the agitating member being provided with a multiplicity of comb teeth projecting through the sheath and adapted to engage and separate the feathers on the body of the fowl.

In testimony whereof I hereunto affix my signature in the presence of two witnesses.

EDWARD F. HUDSON.

Wtinesses:
  E. C. RINK,
  GEORGE M. KASE, Sr.

Copies of this patent may be obtained for five cents each, by addressing the "Commissioner of Patents, Washington, D. C."